Patented Jan. 15, 1929.

1,698,898

UNITED STATES PATENT OFFICE.

HERMANN WAGNER, OF SODEN-ON-THE-TAUNUS, AND OTTO SOHST, OF HOCHST-ON-THE-MAIN, GERMANY, ASSIGNORS TO GRASSELLI DYESTUFF CORPORATION, OF NEW YORK, N. Y., A CORPORATION OF DELAWARE.

AZO DYESTUFFS OF THE 2-HYDROXYNAPHTHALENE-3-CARBOXYLIC ACID ARYLAMIDE SERIES.

No Drawing. Application filed July 3, 1926, Serial No. 120,522, and in Germany July 25, 1925.

The present invention relates to the new azo dyestuffs of the general formula:

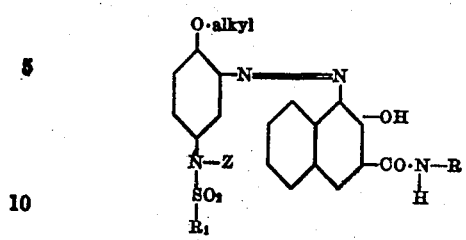

wherein Z represents alkyl or aralkyl and R and $R_1$ represent aryl radicles. These dyestuffs may be obtained by diazotizing an aromatic amine of the general formula:

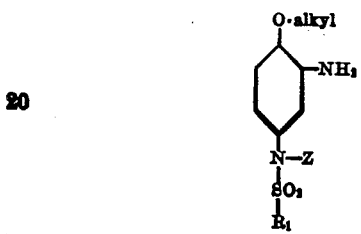

wherein Z represents alkyl or aralkyl and $R_1$ represents an aryl radicle and causing the diazo compound thus obtained to act upon a 2-hydroxy-naphthalene-3-carboxylic acid arylamide. The aromatic amines to be used in this process as starting materials may be obtained, for instance, by causing an aryl sulfochloride to act upon a 4-amino-2-nitro-1-alkoxy benzene and subsequently alkylating or benzylating and reducing the resulting compound.

The dyestuffs in question can be produced in substance, on a substratum or on the fibre. They are like the dyestuffs described in our prior application soluble in concentrated sulfuric acid with a bluish-violet color.

The following examples serve to illustrate our invention but are not intended to limit it thereto:

1. 10 parts by weight of 4-benzenesulfomethylamino-2-amino-1-methoxybenzene are suspended in 100 parts of water with addition of 11 parts of hydrochloric acid of 20° Bé. and 200 parts of ice. The mass is then diazotized with a solution of 2,4 parts of sodium nitrite in 15 parts of water and the diazo compound is then coupled with a solution of 11 parts of 2.3-hydroxynaphthoic acid 5-chlor-2-toluidide in 400 parts of water and 10 parts of caustic soda solution of 40° Bé. Thus a claret-red precipitate is produced which may be filtered off, washed and dried.

The resulting dyestuff is soluble in sulfuric acid of 66° Bé. with a bluish-violet color. It has the probable formula:

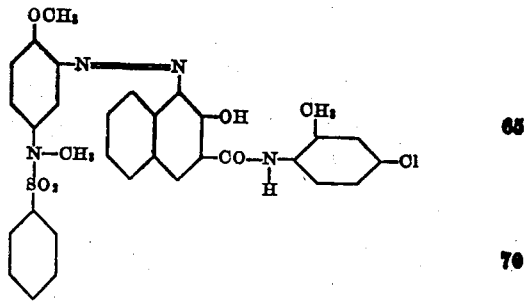

2. For dyeings on yarn there is used a bottoming bath prepared with:

11,85 grams of 2.3-hydroxynaphthoic acid-5-chlor-2-toluidide, 30 cc. of caustic soda solution 34° Bé., 40 cc. of sodium Turkey-red oil, 50% strength, 500 cc. of hot water, the whole made up with cold water to one litre.

A diazotizing bath prepared as follows:

5,84 grams of 4-benzenesulfomethylamino-2-amino-1-methoxybenzene are dissolved in 50 cc. of hot water and 5,2 cc. of hydrochloric acid of 22° Bé.; the solution is cooled with 50 grams of ice and then mixed with a solution of 1,44 grams of sodium nitrite in 10 cc. of water. The whole is then made up with cold water to one litre and before being used there are added 4 grams of sodium acetate.

The cotton yarn, after being boiled and dried, is well impregnated with the bottoming-bath, wound off and then dyed in the diazotizing-bath, whereupon it is wound off, well washed and soaped while boiling.

In this manner there is produced on the yarn a bright claret-red tint with a red hue of good fastness.

Similar dyestuffs are obtained if instead of the components specified in the foregoing examples there are used, on the one hand, other 2 - hydroxynaphthalene - 3 - carboxylic acid arylamides and, on the other hand, other 4-arylsulfone-alkylamino-2-amino-1-alkyloxy-benzenes.

In the following table are stated the shades obtainable by some other dyestuffs falling within the scope of our present invention:

|  | Diazotizing bases. | Coupling components. | Shade. |
|---|---|---|---|
| No. 1 | 4-benzenesulfonmethylamino-2-amino-1-methoxy-benzene. | 2 - hydroxynaphthalene - 3 - carboxylic acid -o - toluidide. | Reddish-Bordeaux. |
| No. 2 | 4 - chlorobenzenesulfonmethylamino - 2 - amino - 1-methoxy-benzene. | 2 - hydroxynaphthalene - 3 - carboxylic acid - o - toluidide. | Very bluish-red. |
| No. 3 | 4 - chlorobenzenesulfonmethylamino - 2 - amino - 1-methoxy-benzene. | 2 -hydroxynaththalene - 3 - carboxylic acid- α - naphthylamide. | Bluish-red. |
| No. 4 | 4-naphthalene -β-sulfonmethylamino-2 -amino-1-methoxy-benzene. | 2 - hydroxynaphthalene - 3 - carboxylic acid - 5 - chloro-2-toluidide. | Reddish-Bordeaux. |
| No. 5 | 4-naphthalene-β-sulfonmethylamino-2-amino-1-methoxy-benzene. | 2-hydroxynaphthalene -3-carboxylic acid-4-chloro-2-anisidide. | Yellowish Bordeaux. |
| No. 6 | 4-naphthalene-β-sulfonmethylamino-2-amino-1-methoxy-benzene. | 2 - hydroxynaphthalene - 3 - carboxylic acid - α - naphthylamide. | Bordeaux. |
| No. 7 | 4-naphthalene-β-sulfonmethylamino-2-amino-1-methoxy-benzene. | 2 - hdroxynaphthalene - 3 - carboxylic acid - β - naphthylamide. | Bordeaux. |
| No. 8 | 4-naphthalene-α-sulfonmethylamino-2-amino-1-methoxy-benzene. | 2 - hydroxynaphthalene - 3 - carboxylic acid - 4 - chloro-2-anisidide. | Yellowish Bordeaux. |
| No. 9 | 4-naphthalene-α-sulfonmethylamino- 2 - amino - 1-methoxy-benzene. | 2 - hydroxynaphthalene - 3 -carboxylic acid - β - naphthylamide. | Yellowish Bordeaux. |
| No. 10 | 4-toluene sulfonmethylamino-2-amino-1-methoxy-benzene. | 2 - hydroxynaphthalene - 3 - carboxylic acid - o - toluidide. | Very bluish red. |
| No. 11 | 4-toluene sulfonmethylamino-2-amino-1-methoxy-benzene. | 2 - hydroxynaphthalene - 3 - carboxylic acid - 4 - chloro-2-anisidide. | Yellowish Bordeaux. |
| No. 12 | 4-toluene sulfonmethylamino-2-amino-1-methoxy-benzene. | 2 - hydroxynaphthalene - 3 - carboxylic acid - α - naphthylamide. | Bordeaux. |
| No. 13 | 4-toluene sulfonmethylamino-2-amino-1-methoxy-benzene. | 2 - hydroxynaphthalene - 3 - carboxylic acid - β - naphthylamide. | Yellowish Bordeaux. |
| No. 14 | 4-toluene-sulfonbenzylamino-2-amino-1-methoxy-benzene. | 2 -hydroxynaphthalene -3- carboxylic acid - 5 - chloro-2-toluidide. | Bluish-red. |
| No. 15 | 4-toluene-sulfonbenzylamino-2-amino-1-methoxy-benzene. | 2 - hydroxynaphthalene - 3 - carboxylic acid - β - naphthylamide. | Yellowish Bordeaux. |

In our co-pending application Serial No. 15,121, filed March 12, 1925, similar azo dyestuffs are described.

We claim:

1. As new compounds, the azo dyestuffs of the general formula:

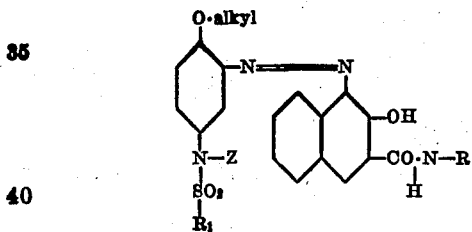

wherein Z represents alkyl or aralkyl and R and $R_1$ represent aryl radicles.

2. As new compounds, the azo dyestuffs of the general formula:

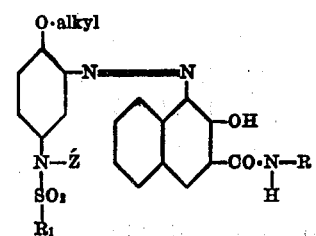

wherein Z represents alkyl or aralkyl and R and $R_1$ represent aromatic nuclei of the group including the benzene and naphthalene series.

3. As new compounds, the azo dyestuffs of the general formula:

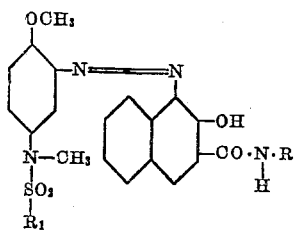

wherein R and $R_1$ represent aromatic nuclei of the group including the benzene and naphthalene series.

4. As a new product, the azo dyestuffs of the probable formula:

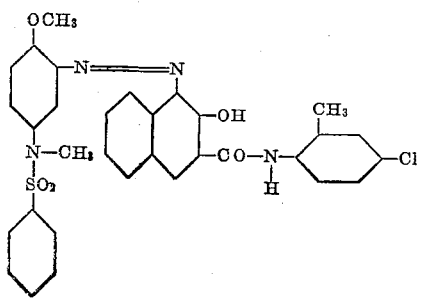

which dyes cotton yarn a bright claret-red tint with a hue of good fastness.

5. The process which comprises diazotizing a compound of the general formula:

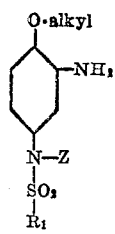

wherein Z represents alkyl or aralkyl and $R_1$ an aryl radicle and coupling the diazo compound thus obtained with a 2-hydroxynaphthalene-3-carboxylic acid-arylamide.

In testimony whereof, we affix our signatures.

HERMANN WAGNER.
OTTO SOHST.